United States Patent
Ogawa

(10) Patent No.: US 11,578,169 B2
(45) Date of Patent: Feb. 14, 2023

(54) PHOTOCURABLE RESIN COMPOSITION

(71) Applicant: CANON KABUSHIKI KAISHA, Tokyo (JP)

(72) Inventor: Ryo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 16/904,374

(22) Filed: Jun. 17, 2020

(65) Prior Publication Data

US 2020/0317863 A1 Oct. 8, 2020

Related U.S. Application Data

(63) Continuation of application No. PCT/JP2018/046006, filed on Dec. 14, 2018.

(30) Foreign Application Priority Data

Dec. 22, 2017 (JP) .............................. JP2017-246054

(51) Int. Cl.

| | |
|---|---|
| C08G 65/26 | (2006.01) |
| B33Y 70/00 | (2020.01) |
| C08F 299/02 | (2006.01) |
| C08L 63/00 | (2006.01) |
| C08G 64/02 | (2006.01) |

(52) U.S. Cl.
CPC ............ C08G 65/269 (2013.01); B33Y 70/00 (2014.12); C08F 299/024 (2013.01); C08G 64/02 (2013.01); C08G 65/2615 (2013.01); C08L 63/00 (2013.01); C08G 2650/16 (2013.01); C08G 2650/22 (2013.01); C08G 2650/38 (2013.01); C08G 2650/62 (2013.01)

(58) Field of Classification Search
CPC combination set(s) only.
See application file for complete search history.

(56) References Cited

U.S. PATENT DOCUMENTS

2020/0308426 A1* 10/2020 James .................. C09D 11/104

FOREIGN PATENT DOCUMENTS

| CN | 105399908 A | 3/2016 | |
|---|---|---|---|
| CN | 107236096 A | 10/2017 | |
| JP | S60-247515 A | 12/1985 | |
| JP | H04-208251 A | 7/1992 | |
| JP | 2006-11395 A | 1/2006 | |
| JP | 2016-24242 A | 2/2016 | |
| JP | 2016024242 A | * 2/2016 | ............. C08G 18/44 |
| JP | 2017-52869 A | 3/2017 | |

OTHER PUBLICATIONS

JP2016024242 English Machine Translation provided by Clarivate Analytics, 2002 (Year: 2002).*

* cited by examiner

*Primary Examiner* — Christopher M Rodd
(74) *Attorney, Agent, or Firm* — Canon U.S.A., Inc., IP Division

(57) ABSTRACT

Provided are a photocurable resin composition that can be suitably used for an optical three-dimensional shaping method, and a cured product obtained by photocuring the composition and a three-dimensional shaped object including the cured product. The photocurable resin composition contains a compound represented by the formula (1) and a compound containing two or more epoxy groups.

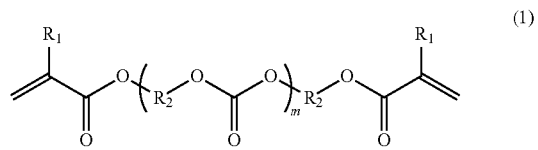

8 Claims, 1 Drawing Sheet

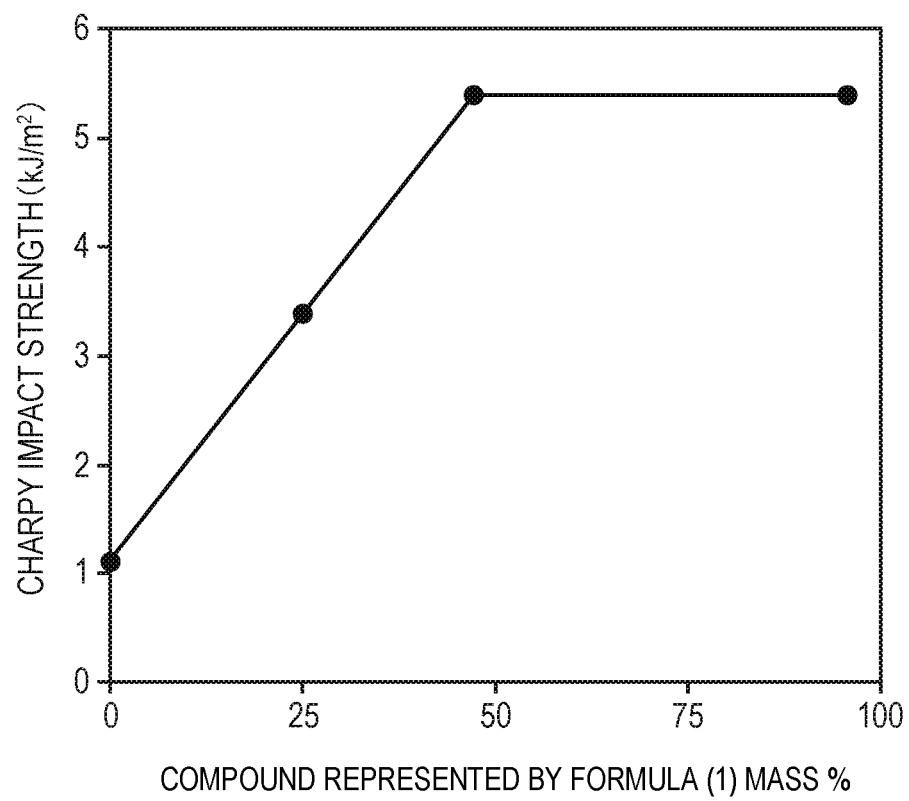

PHOTOCURABLE RESIN COMPOSITION

CROSS-REFERENCE TO RELATED APPLICATIONS

This application is a Continuation of International Patent Application No. PCT/JP2018/046006, filed Dec. 14, 2018, which claims the benefit of Japanese Patent Application No. 2017-246054 filed Dec. 22, 2017, both of which are hereby incorporated by reference herein in their entirety.

BACKGROUND OF THE INVENTION

Field of the Invention

The present disclosure relates to a photocurable resin composition, and a cured product obtained by photocuring the composition and a three-dimensional shaped object including the cured product.

Description of the Related Art

There is known an optical three-dimensional shaping method involving repeating a process of selectively irradiating a photocurable resin composition with light so as to reproduce a predetermined three-dimensional shape to form a cured resin layer, to thereby form a three-dimensional shaped object in which the cured resin layers are integrally stacked (see Japanese Patent Application Laid-Open No. S60-247515). A typical example of the optical three-dimensional shaping method is described below.

First, a liquid surface of a photocurable resin composition accommodated in a container is selectively irradiated with light from an ultraviolet laser or the like so as to draw a cross-sectional pattern of a three-dimensional shaped object to be produced, to thereby form a cured resin layer having a predetermined cross-sectional pattern. Next, an appropriate amount of the photocurable resin composition is supplied onto the cured resin layer, and a liquid surface thereof is irradiated with light so as to draw a next cross-sectional pattern, to thereby integrally stack and form a new cured resin layer on the previously formed cured resin layer in such a manner as to be continuous thereto. In this way, cross-sectional patterns are stacked to repeat the above-mentioned process a predetermined number of times. Thus, the desired three-dimensional shaped object is obtained.

According to the optical three-dimensional shaping method, the three-dimensional shaped object of interest can be obtained easily and in a short period of time even when its shape is complicated.

The photocurable resin composition that may be used for such optical three-dimensional shaping method desirably has a low viscosity, and after its curing, the cured product is required to have high impact resistance. For example, in Japanese Patent Application Laid-Open No. H04-208251, as a photocurable resin composition having a low viscosity, there is disclosed a diacrylate derivative of a polycarbonate diol. A cured product of the diacrylate derivative of the polycarbonate diol has extremely high flexibility, and also has satisfactory impact resistance, which is an improvement over low impact resistance of the cured product which is a disadvantage with the photocurable resin composition.

However, the cured product of the diacrylate derivative of the polycarbonate diol disclosed in Japanese Patent Application Laid-Open No. H04-208251, though improved in impact resistance, does not have a sufficient hardness, and hence is poor in self-shape-retaining property. Accordingly, application of the photocurable resin composition described in Japanese Patent Application Laid-Open No. H04-208251 to the optical three-dimensional shaping method has involved a disadvantage in that the hardness of its cured product is insufficient.

SUMMARY OF THE INVENTION

A photocurable resin composition according to at least one embodiment of the present disclosure is a photocurable resin composition containing a compound represented by the formula (1); a compound containing two or more epoxy groups; a photoradical polymerization initiator; and a photocationic polymerization initiator. The present disclosure has been made in order to solve the above-mentioned disadvantage, and an object of the present disclosure is to provide a photocurable resin composition that can be suitably used for an optical three-dimensional shaping method, and a cured product obtained by photocuring the composition and a three-dimensional shaped object including the cured product.

Therefore, a photocurable resin composition according to at least one embodiment of the present disclosure contains a compound represented by the following formula (1); a compound containing two or more epoxy groups; a photoradical polymerization initiator; and a photocationic polymerization initiator.

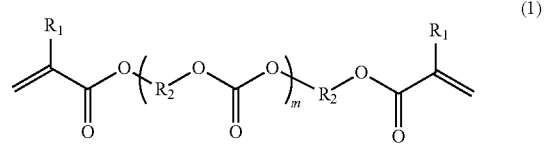

(1)

In the formula (1): "m" represents an integer of from 2 to 50; $R_1$s each represent H or $CH_3$, and $R_1$s may be identical to or different from each other; and a plurality of $R_2$s represent saturated hydrocarbon groups each having 2 to 8 carbon atoms in a main chain thereof, which may be identical to or different from each other, and the saturated hydrocarbon groups may each have a side chain.

In addition, a cured product according to at least one embodiment of the present disclosure contains a structure represented by the following formula (1') and a structure in which at least one epoxy group of a compound containing two or more epoxy groups is ring-opened.

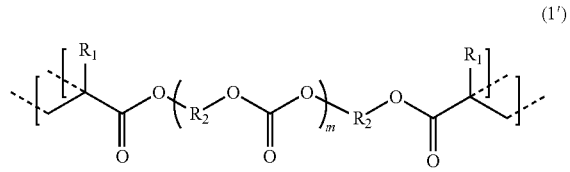

(1')

In the formula (1'): "m" represents an integer of from 2 to 50; $R_1$s each represent H or $CH_3$, and $R_1$s may be identical to or different from each other; and a plurality of $R_2$s represent saturated hydrocarbon groups each having 2 to 8 carbon atoms in a main chain thereof, which may be identical to or different from each other, and the saturated hydrocarbon groups may each have a side chain.

Further features of the present disclosure will become apparent from the following description of exemplary embodiments with reference to the attached drawing.

BRIEF DESCRIPTION OF THE DRAWINGS

FIGURE shows a relationship between the concentration of a compound represented by the formula (1) in a photocurable composition and the Charpy impact strength of a cured product of the photocurable composition.

DESCRIPTION OF THE EMBODIMENTS

Embodiments of the present disclosure are described below. The embodiments described below are merely some of the embodiments of the present disclosure, and the present disclosure is not limited to these embodiments.

Photocurable Resin Composition

Compound Represented by Formula (1)

A compound represented by the formula (1), which is a component of a photocurable resin composition according to at least one embodiment of the present disclosure, contains (meth)acryl groups at both terminals of a polycarbonate moiety.

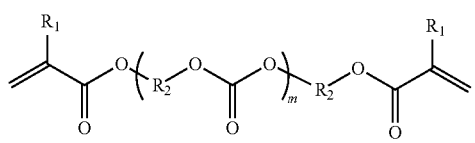

(1)

In the formula (1): "m" represents an integer of from 2 to 50; $R_1$s each represent H or $CH_3$, and $R_1$s may be identical to or different from each other; and a plurality of $R_2$s represent saturated hydrocarbon groups each having 2 to 8 carbon atoms in a main chain thereof, which may be identical to or different from each other, and the saturated hydrocarbon groups may each have a side chain.

The saturated hydrocarbon groups serving as $R_2$s in the formula (1) may each be a linear saturated hydrocarbon group or a cyclic saturated hydrocarbon group. When any of the saturated hydrocarbon groups is a cyclic saturated hydrocarbon group, that part of its cyclic portion which has the larger number of carbons is regarded as the main chain. For example, when $R_2$ represents cyclopentan-1,3-yl, the main chain has 3 carbon atoms. In addition, the saturated hydrocarbon groups may each have a side chain.

A cured product obtained by polymerizing the compound represented by the formula (1) has high performance in absorbing an impact at the time of deformation, and a cured product according to at least one embodiment of the present disclosure shows high toughness and can be suitably used for a three-dimensional shaped object.

In addition, a case in which the photocurable resin composition has an excessively high viscosity in a liquid state is not preferred for its application to an optical three-dimensional shaping method because it takes time to supply the photocurable resin composition in an amount corresponding to one layer onto a cured resin layer. Therefore, in order to maintain an appropriate viscosity for the use of the photocurable resin composition according to at least one embodiment of the present disclosure for the optical three-dimensional shaping method, the compound represented by the formula (1) preferably has a number-average molecular weight of 300 or more and 50,000 or less, and more preferably has a number-average molecular weight of 300 or more and 10,000 or less. In addition, when the number-average molecular weight is high, reactivity at the time of photocuring is reduced, with the result that a photocuring reaction at the time of shaping takes time or a curing failure is caused. Therefore, the number-average molecular weight of the compound represented by the formula (1) is still more preferably 300 or more and 3,500 or less.

Further, the photocurable resin composition according to at least one embodiment of the present disclosure is required to be in a liquid state over a long period of time during the shaping of a three-dimensional shaped object. Therefore, in order to prevent the compound represented by the formula (1) from crystallizing and settling, $R_2$s each preferably represent a saturated hydrocarbon group so that crystallization may be suppressed. This is because, when $R_2$s each represent an unsaturated hydrocarbon group, π-electrons are liable to interact with each other, with the result that crystallization is promoted. Conversely, when $R_2$s each represent a saturated hydrocarbon group, an intermolecular interaction is weak, and hence crystallization can be suppressed.

Moreover, from the viewpoint of suppressing crystallization, $R_2$s in the formula (1) more preferably represent different saturated hydrocarbon groups. This is because, when the compound represented by the formula (1) is formed only of similar structures, main skeletons thereof are liable to be aligned with each other, with the result that crystallization is liable to occur. Therefore, the polycarbonate moiety in the compound represented by the formula (1) may have any of a random copolymer structure or a block copolymer structure, but preferably has a random copolymer structure.

From the viewpoints of lowering the viscosity of the compound represented by the formula (1) and suppressing its crystallization, $R_2$s each preferably represent a structure selected from the group consisting of structures represented by the following formulae (2) to (6).

(2)

In the formula (2), "a" represents an integer of from 2 to 8.

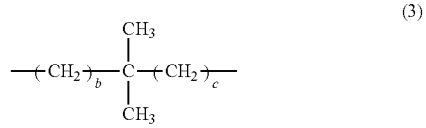

(3)

In the formula (3), b+c is an integer of from 2 to 7.

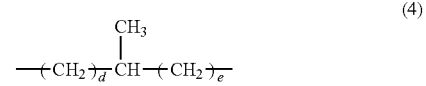

(4)

In the formula (4), d+e is an integer of from 2 to 7.

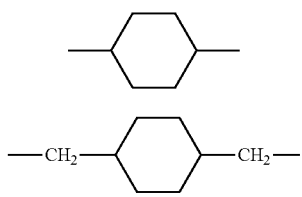
(5)

(6)

In the formula (1), Res are each more preferably selected from the group consisting of the structure represented by the formula (6) and structures represented by the following formulae (7) to (9), particularly because of excellent ease of availability.

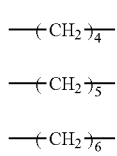
(7)

(8)

(9)

Therefore, in order to obtain a compound represented by the formula (1) having low crystallinity through the use of an easily available raw material, R2s preferably represent a combination of: the structure represented by the formula (6); and at least one structure selected from the group consisting of the structures represented by the formulae (7) to (9).

The content of the compound represented by the formula (1) in the photocurable resin composition according to at least one embodiment of the present disclosure is from 20 parts by mass to 60 parts by mass with respect to 100 parts by mass of the photocurable resin composition according to at least one embodiment of the present disclosure.

The compound represented by the formula (1) may be produced by, for example, subjecting a polycarbonate diol represented by the following formula (10) to a reaction with a (meth)acrylic acid represented by the formula (11) or a (meth)acrylic acid chloride represented by the formula (12) at a molar ratio of 1:2 through the use of a known method.

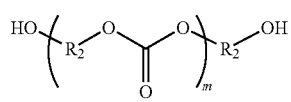
(10)

In the formula (10), "m" and R2s represent the same as in the formula (1).

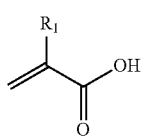
(11)

In the formula (11), $R_1$ represents the same as in the formula (1).

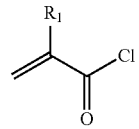
(12)

In the formula (12), $R_1$ represents the same as in the formula (1).

As a specific example of the polycarbonate diol represented by the formula (10), it is preferred that Res each represent a structure selected from the group consisting of the structures represented by the formulae (2) to (6).

When the (meth)acrylic acid chloride represented by the formula (12) and the polycarbonate diol represented by the formula (10) are allowed to react with each other, there is a risk in that a carbonate group may be decomposed, and hence it is preferred that the synthesis reaction be allowed to slowly proceed at low temperature.

The photocurable resin composition according to at least one embodiment of the present disclosure may contain, in addition to the compound represented by the formula (1), a compound obtained by esterifying both terminal hydroxy groups of the polycarbonate diol represented by the formula (10) with a carboxylic acid having a (meth)acryloyl group. An example of such compound is a compound obtained by esterifying both terminal hydroxy groups of the polycarbonate diol represented by the formula (10) with mono(2-acryloyloxyethyl) succinate.

Compound Containing Two or More Epoxy Groups

The photocurable resin composition according to at least one embodiment of the present disclosure contains a compound containing two or more epoxy groups. When the compound represented by the formula (1) is used alone, the hardness of the cured product of the composition is insufficient. Consequently, in the shaping of a three-dimensional shaped object by the optical three-dimensional shaping method, a change in shape, such as deflection due to its own weight, is liable to occur, and hence it is difficult to keep the shaping precision of the three-dimensional shaped object. Accordingly, when the composition has the compound containing two or more epoxy groups added thereto to become the photocurable resin composition according to at least one embodiment of the present disclosure, a cured product according to at least one embodiment of the present disclosure and a three-dimensional shaped object including the cured product can each obtain a sufficient hardness.

The polymerization mechanism of the compound represented by the formula (1) in the photocurable resin composition according to at least one embodiment of the present disclosure is radical polymerization, and the polymerization mechanism of the compound containing two or more epoxy groups is cationic polymerization. As a result of the photocurable resin composition according to at least one embodiment of the present disclosure being cured by two polymerization mechanisms, its cured product has formed therein an interpenetrating network (IPN) structure in which a network (network structure) containing a polymer of the compound represented by the formula (1) and a network (network structure) containing an epoxy resin that is a polymer of the compound containing two or more epoxy groups are entangled with each other. By virtue of the effect of the IPN structure, the cured product of the photocurable resin composition according to at least one embodiment of the present disclosure achieves a hardness that the compound represented by the formula (1) alone cannot achieve, and besides, can keep high toughness unimpaired.

The compound containing two or more epoxy groups to be used in the present disclosure may be a monomer, or may be a prepolymer. Specific examples thereof include compounds each containing two or more epoxy groups that become, for example, a bisphenol A-type epoxy resin, a bisphenol F-type epoxy resin, a biphenyl-type epoxy resin, a tetramethylbiphenyl-type epoxy resin, a naphthalene-type epoxy resin, a phenol novolac-type epoxy resin, a cresol novolac-type epoxy resin, a triphenylmethane-type epoxy resin, a tetraphenylethane-type epoxy resin, a dicyclopentadiene-phenol addition reaction-type epoxy resin, a phenol aralkyl-type epoxy resin, a naphthol novolac-type epoxy resin, a naphthol aralkyl-type epoxy resin, a naphthol-phenol co-condensation novolac-type epoxy resin, a naphthol-cresol co-condensation novolac-type epoxy resin, an aromatic hydrocarbon formaldehyde resin-modified phenol resin-type epoxy resin, a biphenyl-modified novolac-type epoxy resin, or a naphthylene ether-type epoxy resin, when subjected to polymerization. The compound containing two or more epoxy groups preferably has an aromatic ring in order to enhance the toughness and hardness of the cured product of the photocurable resin composition according to at least one embodiment of the present disclosure.

Such compound containing two or more epoxy groups may be any of monomers and polymers including oligomers. When the photocurable resin composition according to at least one embodiment of the present disclosure is used for the optical three-dimensional shaping method, the photocurable resin composition preferably has low crystallinity so as to be hardly solidified, and its cured product is required to have a hardness. Therefore, the compound containing two or more epoxy groups is preferably a compound that becomes a bisphenol-type epoxy resin. Of the compounds that become bisphenol-type epoxy resins, a monomer such as bisphenol A diglycidyl ether or bisphenol F diglycidyl ether is particularly preferred as the compound containing two or more epoxy groups because the photocurable resin composition according to at least one embodiment of the present disclosure is reduced in viscosity.

The content of the compound containing two or more epoxy groups in the photocurable resin composition according to at least one embodiment of the present disclosure is from 40 parts by mass to 80 parts by mass with respect to 100 parts by mass of the photocurable resin composition according to at least one embodiment of the present disclosure.

Photoradical Polymerization Initiator

The photocurable resin composition according to at least one embodiment of the present disclosure contains a photoradical polymerization initiator in order to polymerize the compound represented by the formula (1).

Radical polymerization initiators are mainly classified into an intramolecular cleavage type and a hydrogen abstraction type. When the intramolecular cleavage-type radical polymerization initiator absorbs light having a specific wavelength, a bond at a specific site is cleaved, and a radical is generated at the cleaved site to serve as a polymerization initiator to initiate the polymerization of a polymerizable (meth)acrylic compound. Meanwhile, the hydrogen abstraction type absorbs light having a specific wavelength to be brought into an excited state, and the resultant excited species causes a hydrogen abstraction reaction from a hydrogen donor present in the surroundings to generate a radical, which serves as a polymerization initiator to initiate the polymerization of both terminal double bonds of the compound represented by the formula (1).

As the intramolecular cleavage-type photoradical polymerization initiator, an alkylphenone-based photoradical polymerization initiator, an acylphosphine oxide-based photoradical polymerization initiator, and an oxime ester-based photoradical polymerization initiator are known. Each of those polymerization initiators is a type which generates a radical species through the a-cleavage of a bond adjacent to a carbonyl group. Examples of the alkylphenone-based photoradical polymerization initiator include a benzyl methyl ketal-based photoradical polymerization initiator, an α-hydroxyalkylphenone-based photoradical polymerization initiator, and an aminoalkylphenone-based photoradical polymerization initiator. Specific examples of the compound include: 2,2'-dimethoxy-1,2-diphenylethan-1-one (product name: "Irgacure (trademark) 651", manufactured by BASF) as the benzyl methyl ketal-based photoradical polymerization initiator; and 2-hydroxy-2-methyl-1-phenylpropan-1-one (product name: "Darocur (trademark) 1173", manufactured by BASF), 1-hydroxycyclohexyl phenyl ketone (product name: "Irgacure (trademark) 184", manufactured by BASF), 1-[4-(2-hydroxyethoxy)phenyl]-2-hydroxy-2-methyl-1-propan-1-one (product name: "Irgacure (trademark) 2959", manufactured by BASF), or 2-hydroxy-1-{4-[4-(2-hydroxy-2-methyl propionyl)benzyl]phenyl}-2-methylpropan- 1-one (product name: "Irgacure (trademark) 127", manufactured by BASF) as the α-hydroxyalkylphenone-based photoradical polymerization initiator. Further, examples thereof also include, but not limited to: 2-methyl-1-(4-methylthiophenyl)-2-morpholinopropan-1-one (product name: "Irgacure (trademark) 907", manufactured by BASF) or 2-benzylmethyl-2-dimethylamino-1-(4-morpholinophenyl)-1-butanone (product name: "Irgacure (trademark) 369", manufactured by BASF) as the aminoalkylphenone-based photoradical polymerization initiator; 2,4,6-trimethylbenzoyldiphenylphosphine oxide (product name: "Lucirin (trademark) TPO", manufactured by BASF), bis(2,4,6-trimethylbenzoyl)-phenylphosphine oxide (product name: "Irgacure (trademark) 819", manufactured by BASF) as the acylphosphine oxide-based photoradical polymerization initiator; and (2E)-2-(benzoyloxyimino)-1-[4-(phenylthio)phenyl]octan-1-one (product name: "Irgacure (trademark) OXE-01", manufactured by BASF) as the oxime ester-based photoradical polymerization initiator.

Examples of the hydrogen abstraction-type radical polymerization initiator include, but not limited to: anthraquinone derivatives, such as 2-ethyl-9,10-anthraquinone and 2-t-butyl-9,10-anthraquinone; and thioxanthone derivatives, such as isopropylthioxanthone and 2,4-diethylthioxanthone.

In the photocurable resin composition according to at least one embodiment of the present disclosure, the photoradical polymerization initiators may be used alone or in combination thereof. In addition, the photocurable resin composition according to at least one embodiment of the present disclosure may further contain a thermal radical polymerization initiator in order to allow a polymerization reaction to proceed through heat treatment after the shaping of a three-dimensional shaped object.

The content of the photoradical polymerization initiator in the photocurable resin composition according to at least one embodiment of the present disclosure is preferably from 0.1 part by mass to 15 parts by mass, more preferably from 0.1 part by mass to 10 parts by mass with respect to 100 parts by mass of the compound represented by the formula (1).

When the content of the photoradical polymerization initiator is low, the polymerization of the compound represented by the formula (1) tends to be insufficient. In addition, when the content of the photoradical polymerization initiator is high, light transmissivity is reduced, with the result that the polymerization of the compound represented by the formula (1) becomes nonuniform in some cases.

(Photocationic Polymerization Initiator)

The photocurable resin composition according to at least one embodiment of the present disclosure contains a photocationic polymerization initiator in order to polymerize the compound containing two or more epoxy groups.

The photocationic polymerization initiator is, for example, a photocationic polymerization initiator that generates an acid capable of initiating cationic polymerization through irradiation with an energy ray, such as an ultraviolet ray.

As the photocationic polymerization initiator, for example, salts in which a cation moiety is formed of an aromatic sulfonium, an aromatic iodonium, an aromatic diazonium, an aromatic ammonium, thianthrenium, thioxanthonium, or a [cyclopentadienyl(1-methylethylbenzene)-Fe] cation, and an anion moiety is formed of $BF_4^-$, $PF_6^-$, $SbF_6^-$, or $BX_4^-$ (provided that X represents a phenyl group substituted with at least two or more fluorine atoms or trifluoromethyl groups) may be used alone or in combination thereof.

As the aromatic sulfonium salt, there may be used, for example, bis[4-(diphenylsulfonio)phenyl]sulfide bishexafluorophosphate, bis [4-(diphenylsulfonio)phenyl] sulfide bishexafluoroantimonate, bis [4-(diphenylsulfonio)phenyl]sulfide bistetrafluoroborate, bis [4-(diphenylsulfonio)phenyl]sulfide tetrakis(pentafluorophenyl)borate, diphenyl-4-(phenylthio)phenylsulfonium hexafluorophosphate, diphenyl-4-(phenylthio)phenylsulfonium hexafluoroantimonate, diphenyl-4-(phenylthio)phenylsulfonium tetrafluoroborate, diphenyl-4-(phenylthio)phenylsulfonium tetrakis(pentafluorophenyl)borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis [4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis [4-(di(4-(2-hydroxyethoxy))phenylsulfonio)phenyl]sulfide bistetrafluoroborate, and bis[4-(di(4-(2-hydroxyethoxy))phenylsulfonio)phenyl]sulfide tetrakis(pentafluorophenyl)borate.

In addition, as the aromatic iodonium salt, there may be used, for example, diphenyliodonium hexafluorophosphate, diphenyliodonium hexafluoroantimonate, diphenyliodonium tetrafluoroborate, diphenyliodonium tetrakis(pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate, and 4-methylphenyl-4-(1-methylethyl)phenyliodonium tetrakis(pentafluorophenyl)borate.

In addition, as the aromatic diazonium salt, there may be used, for example, phenyldiazonium hexafluorophosphate, phenyldiazonium hexafluoroantimonate, phenyldiazonium tetrafluoroborate, and phenyldiazonium tetrakis (pentafluorophenyeborate.

In addition, as the aromatic ammonium salt, there may be used, for example, 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis (pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate, and 1-(naphthylmethyl)-2-cyanopyridinium tetrakis(pentafluorophenyl)borate.

In addition, as the thioxanthonium salt, there may be used, for example, S-biphenyl 2-isopropylthioxanthonium hexafluorophosphate.

In addition, as the [cyclopentadienyl (1-methylethylbenzene)-Fe] cation salt, there may be used, for example, [cyclopentadienyl (1-methylethylbenzene)-Fe] hexafluorophosphate, [cyclopentadienyl (1-methylethylbenzene)-Fe] hexafluoroantimonate, [cyclopentadienyl (1-methylethylbenzene)-Fe] tetrafluoroborate, and [cyclopentadienyl (1-methylethylbenzene)-Fe] tetrakis(pentafluorophenyl)borate.

As commercially available products of the photocationic polymerization initiators, for example, CPI-100P, CPI-110P, CPI-101A, CPI-200K, and CPI-210S (all of which are manufactured by San-Apro Ltd.), Cyracure photocuring initiator UVI-6990, Cyracure photocuring initiator UVI-6992, and Cyracure photocuring initiator UVI-6976 (all of which are manufactured by Dow Chemical Japan Limited), ADEKA OPTOMER SP-150, ADEKA OPTOMER SP-152, ADEKA OPTOMER SP-170, ADEKA OPTOMER SP-172, and ADEKA OPTOMER SP-300 (all of which are manufactured by ADEKA Corporation), CI-5102 and CI-2855 (all of which are manufactured by Nippon Soda Co., Ltd.), SAN AID SI-60L, SAN AID SI-80L, SAN AID SI-100L, SAN AID SI-110L, SAN AID SI-180L, SAN AID SI-110, and SAN AID SI-180 (all of which are manufactured by Sanshin Chemical Industry Co., Ltd.), Esacure 1064 and Esacure 1187 (all of which are manufactured by Lambeth S.p.A.), Omnicat 550 (manufactured by IGM Resins), Irgacure (trademark) 250 (manufactured by BASF), and Rhodorsil Photoinitiator 2074 (manufactured by Rhodia Japan Ltd.) are commercially available.

In the photocurable resin composition according to at least one embodiment of the present disclosure, the photocationic polymerization initiators may be used alone or in combination thereof. In addition, the photocurable resin composition according to at least one embodiment of the present disclosure may further contain a thermal cationic polymerization initiator that generates an acid through heating or the like in order to allow a polymerization reaction to proceed through heat treatment after the shaping of a three-dimensional shaped object. However, when the cured product of the photocurable resin composition according to at least one embodiment of the present disclosure is used as a material for a liquid crystal module, from the viewpoint of preventing discoloration or the like due to heat, it is preferred that only the photocationic polymerization initiator be used.

The content of the photocationic polymerization initiator in the photocurable resin composition according to at least one embodiment of the present disclosure is preferably from 0.1 part by mass to 15 parts by mass, more preferably from 0.1 part by mass to 10 parts by mass with respect to 100 parts by mass of the compound containing two or more epoxy groups. When the content of the photocationic polymerization initiator is low, the polymerization of the compound containing two or more epoxy groups tends to be insufficient. In addition, when the content of the photocationic polymerization initiator is high, light transmissivity is reduced, with the result that the polymerization of the compound containing two or more epoxy groups becomes nonuniform in some cases.

Other (Meth)acrylate Compound

The photocurable resin composition according to at least one embodiment of the present disclosure may contain a (meth)acrylate compound other than the compound represented by the formula (1), and may contain two or more kinds of (meth)acrylate compounds in combination, as long as the effects of the present disclosure are not impaired.

Examples of the other (meth)acrylate compound include a monofunctional (meth)acrylate compound having one (meth)acryloyl group in the molecule, and a polyfunctional (meth)acrylate compound having two or more (meth)acryloyl groups. The other (meth)acrylate compound to be contained in the photocurable resin composition according to at least one embodiment of the present disclosure is a polymerizable (meth)acrylate compound that can be polymerized by a general method.

Examples of the monofunctional (meth)acrylate compound include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, adamantyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, tetrahydrofurfuryl (meth)acrylate, phenylglycidyl (meth)acrylate, dimethylaminomethyl (meth)acrylate, phenyl cellosolve (meth)acrylate, dicyclopentenyl (meth)acrylate, dicyclopentenyloxyethyl (meth)acrylate, biphenyl (meth)acrylate, 2-hydroxyethyl (meth)acryloyl phosphate, phenyl (meth)acrylate, phenoxyethyl (meth)acrylate, phenoxypropyl (meth)acrylate, and benzyl (meth)acrylate.

Examples of the polyfunctional (meth)acrylate compound may include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4 butanediol di(meth)acrylate, dimethylol tricyclodecane di(meth)acrylate, trimethylolpropane ti(meth)acrylate, neopentyl glycol di(meth)acrylate, 1,6-hexamethylene di(meth)acrylate, hydroxypivalic acid ester neopentyl glycol di(meth)acrylate, pentaerythritol ti(meth)acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate, and tris(meth)acryloxyethyl isocyanurate.

When the photocurable resin composition according to at least one embodiment of the present disclosure contains only the compound represented by the formula (1) as a compound having a (meth)acryl group, its cured product may be a cured product whose hardness is not sufficient. Therefore, in such case, the photocurable resin composition according to at least one embodiment of the present disclosure preferably contains the above-mentioned (meth)acrylate compound.

As the monofunctional (meth)acrylate compound that provides a hard cured product, there may be used, for example, isobornyl (meth)acrylate, adamantyl (meth)acrylate, and dicyclopentenyl (meth)acrylate. When any such (meth)acrylate compound is added to the photocurable resin composition according to at least one embodiment of the present disclosure, the compound is added at 1 part by mass or more and 1,000 parts by mass or less, preferably 10 parts by mass or more and 300 parts by mass or less with respect to 100 parts by mass of the compound represented by the formula (1), so that the toughness of the cured product according to at least one embodiment of the present disclosure may not be impaired.

As the polyfunctional (meth)acrylate compound, there may be suitably used, for example, dimethylol tricyclodecane di(meth)acrylate, trimethylolpropane tri(meth)acrylate, and neopentyl glycol di(meth)acrylate. When any such polyfunctional (meth)acrylate compound is added to the photocurable resin composition according to at least one embodiment of the present disclosure, the compound is added at 1 part by mass or more and 1,000 parts by mass or less, preferably 10 parts by mass or more and 300 parts by mass or less with respect to 100 parts by mass of the compound represented by the formula (1), so that the toughness of the cured product according to at least one embodiment of the present disclosure may not be impaired.

One or more kinds of the monofunctional (meth)acrylate compounds and the polyfunctional (meth)acrylate compounds may be optionally used by being mixed in the photocurable resin composition according to at least one embodiment of the present disclosure.

Other Compound

The photocurable resin composition according to at least one embodiment of the present disclosure may further contain a polymerizable compound, such as an alicyclic epoxy compound or an oxetane compound, or a polymerized product thereof.

The "alicyclic epoxy compound" refers to a compound having an alicyclic epoxy group constituted of: two carbon atoms adjacent to an oxygen atom and the oxygen atom that constitute an alicyclic group. Examples thereof include, but not limited to, 3,4-epoxycyclohexylmethyl 3',4'-epoxycyclohexanecarboxylate (product name: "CELLOXIDE 2021P", manufactured by Daicel Corporation) and 3,4,3',4'-diepoxybicyclohexyl (product name: "CELLOXIDE 8000", manufactured by Daicel Corporation).

The "oxetane compound" refers to a compound containing an oxetanyl group, which is an oxygen atom-containing 4-membered ring. Examples thereof include, but not limited to, 2-ethyl-3-hydroxymethyloxetane (oxetane alcohol) (product name: "OXT-101", Toagosei Co., Ltd.), 2-ethylhexyloxetane (product name: "OXT-212", Toagosei Co., Ltd.), xylylene bisoxetane (product name: "OXT-121", Toagosei Co., Ltd.), and 3-ethyl-3{[(3 -ethyloxetane-3 -yl) methoxy]methyl}oxetane (product name: "OXT-221", Toagosei Co., Ltd.).

When any such compound or polymerized product thereof is added to the photocurable resin composition according to at least one embodiment of the present disclosure, the compound or polymerized product is added at 1 part by mass or more and 1,000 parts by mass or less, preferably 10 parts by mass or more and 300 parts by mass or less with respect to 100 parts by mass of the compound containing two or more epoxy groups, so that the toughness of the cured product according to at least one embodiment of the present disclosure may not be impaired.

In addition, the photocurable resin composition according to at least one embodiment of the present disclosure may contain various additives as other optional components, as long as the object and effects of the present disclosure are not impaired. Examples of such additive may include: polymers or oligomers, such as an epoxy resin, polyamide, polyamide imide, polyurethane, polybutadiene, polychloroprene, polyether, polyester, a styrene-butadiene block copolymer, a petroleum resin, a xylene resin, a ketone resin, a cellulose resin, a fluorine-based oligomer, a silicone-based oligomer, and a polysulfide-based oligomer; polymerization inhibitors, such as phenothiazine and 2,6-di-t-butyl-4-methylphenol; polymerization initiating aids; leveling agents; wettability improving agents; surfactants; plasticizers; UV absorbing agents; silane coupling agents; inorganic fillers; pigments; and dyes.

The photocurable resin composition according to at least one embodiment of the present disclosure may be produced by loading a stirring container with appropriate amounts of the compound represented by the formula (1) and the compound containing two or more epoxy groups, and as required, the photoradical polymerization initiator, the photocationic polymerization initiator, the other (meth)acrylate compound, and the other compound, and other optional components, and stirring the contents at a temperature of from 30° C. to 70° C., preferably from 50° C. to 60° C., for from 1 hour to 6 hours, preferably from 1 hour to 2 hours.

The viscosity of the photocurable resin composition according to at least one embodiment of the present disclosure at 25° C. is preferably from 50 mPa·s to 10,000 m Pa·s, more preferably from 70 mPa·s to 5,000 mPa·s.

The photocurable resin composition according to at least one embodiment of the present disclosure, which is obtained as described above, is suitably used as a photocurable resin composition in the optical three-dimensional shaping method. The cured product according to at least one embodiment of the present disclosure may be obtained by selectively irradiating the photocurable resin composition according to at least one embodiment of the present disclosure with an active energy ray, such as an ultraviolet ray, an electron beam, an X-ray, or an radiation, to supply energy required for curing.

An ultraviolet ray having a wavelength of from 300 nm to 450 nm is preferably used as the active energy ray from an economical point of view, and a ultraviolet laser (e.g., an Ar laser or a He—Cd laser), a mercury lamp, a xenon lamp, halogen lamp, a fluorescent lamp, or the like may be used as a light source. Of those, an ultraviolet laser is preferably used because the ultraviolet laser can be increased in energy level to shorten a curing time, and besides, is excellent in light condensing property.

When the required energy is supplied to the photocurable resin composition according to at least one embodiment of the present disclosure by the above-mentioned method, radical polymerization occurs via both terminal double bonds of the compound represented by the formula (1), to thereby generate a structure represented by the formula (1').

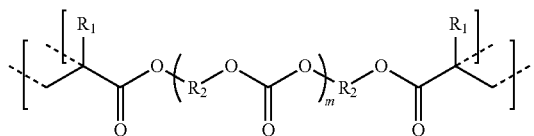

(1')

In the formula (1'), "m", $R_1$s, and $R_2$s represent the same as in the formula (1).

At the same time, at least one epoxy group of the compound containing two or more epoxy groups is ring-opened, causing a polymerization reaction to proceed to generate an epoxy resin derived from the compound containing two or more epoxy groups.

As a result of the foregoing, the cured product according to at least one embodiment of the present disclosure contains an IPN structure in which a network containing the structure represented by the formula (1') and a network containing the epoxy resin that is polymer of the compound containing two or more epoxy groups are entangled with each other.

By virtue of the effect of the IPN structure, the cured product according to at least one embodiment of the present disclosure exhibits a hardness that the structure represented by the formula (1') alone cannot provide, and besides, becomes a cured product excellent in toughness and having a high self-shape-retaining property at the time of shaping.

Three-Dimensional Shaped Object

A three-dimensional shaped object according to at least one embodiment of the present disclosure may be produced using a known optical three-dimensional shaping method and apparatus. As a preferred example of a manufacturing method for the three-dimensional shaped object involving shaping the photocurable resin composition according to at least one embodiment of the present disclosure by the optical three-dimensional shaping method, there may be given a method in which the three-dimensional shaped object of interest is obtained by repeating the following stacking operation: the photocurable resin composition according to at least one embodiment of the present disclosure is selectively irradiated with an active energy ray so that a cured layer having a desired pattern may be obtained, to form a cured layer, and the photocurable resin composition according to at least one embodiment of the present disclosure is successively supplied onto the cured layer, to form a continuous cured layer thereon.

Examples of the active energy ray with which the photocurable resin composition according to at least one embodiment of the present disclosure is to be irradiated so as to obtain a cured layer having a desired pattern may include an ultraviolet ray, an electron beam, an X-ray, and a radiation. Of those, an ultraviolet ray having a wavelength of from 300 nm to 450 nm is preferably used from an economical point of view, and in this case, an ultraviolet laser (e.g., an Ar laser or a He-Cd laser), a mercury lamp, a xenon lamp, a halogen lamp, a fluorescent lamp, or the like may be used as a light source. An ultraviolet laser is preferably adopted because the ultraviolet laser can be increased in energy level to shorten a shaping time, and besides, is excellent in light condensing property, and hence can provide high shaping precision.

In the formation of a cured layer having a predetermined shape pattern by irradiating a shaped surface formed of the photocurable resin composition according to at least one embodiment of the present disclosure with the active energy ray, a cured resin layer may be formed in a dot-drawing or line-drawing mode using an active energy ray condensed into a dot shape, such as laser light. In addition, the following shaping mode may be adopted: the cured resin layer is formed by irradiating the shaped surface with the active energy ray in a planar shape through a planar drawing mask formed by arranging a plurality of micro-optical shutters, such as liquid crystal shutters or digital micro-mirror shutters.

A typical example of the three-dimensional shaping method is described below.

First, a supporting stage arranged to be vertically movable in an accommodating container is lowered (settled) in a minute quantity from a liquid surface of the photocurable resin composition according to at least one embodiment of the present disclosure, to thereby supply the photocurable resin composition according to at least one embodiment of the present disclosure onto the supporting stage to form a first thin layer thereof.

Next, the first thin layer is selectively irradiated with light to form a first cured resin layer in a solid state.

Next, the photocurable resin composition according to at least one embodiment of the present disclosure is supplied onto the first cured resin layer to form a second thin layer, and the second thin layer is selectively irradiated with light to form a second cured resin layer on the first cured resin layer in such a manner as to be continuous thereto and integrally stacked thereon.

Then, while the pattern to be irradiated with light is changed or unchanged, the above-mentioned process is repeated, to thereby shape a three-dimensional shaped object in which a plurality of cured resin layers (first to n-th cured resin layers) are integrally stacked.

The three-dimensional shaped object thus obtained is taken out of the accommodating container, and an unreacted photocurable resin composition remaining on its surface is removed, followed by cleaning as required. Herein, as a cleaning agent, there may be given, for example: alcohol-based organic solvents typified by isopropyl alcohol and ethyl alcohol; ketone-based organic solvents typified by acetone and methyl ethyl ketone; ester-based organic solvents typified by ethyl acetate; and aliphatic organic solvents typified by terpenes.

After the cleaning with the cleaning agent, the three-dimensional shaped object may be post-cured by applying light or heat as required. The post-curing can cure the unreacted photocurable resin composition remaining on the surface and inside of the three-dimensional shaped object, and hence can suppress stickiness of the surface of the shaped object, and besides, can enhance the initial strength of the shaped object.

EXAMPLES

The present disclosure is specifically described below by way of Examples, but the present disclosure is not limited to these Examples. In these Examples, the term "part(s)" means "part(s) by mass" unless otherwise stated.

Materials

Compound Represented by Formula (1)

(A-1) Di(meth)acrylate derivative of polycarbonate diol (product name: "UM-90(1/3)DA", manufactured by Ube Industries, Ltd. (number-average molecular weight=900))

A-1 is a compound represented by the formula (1) in which Res represent

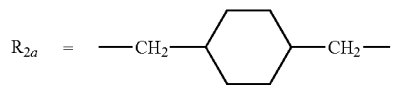

and $R_{2b}$=—$(CH_2)_6$—, and in which their molar ratio ($R_{2a}$:$R_{2b}$) is 1:3.

(A-2) Diacrylate derivative of polycarbonate diol

500 Parts of toluene that had been hydrated was added to 100 parts of a polycarbonate diol, which was a polycarbonate diol represented by the formula (10) in which $R_2$s represented —$(CH_2)_5$— and —$(CH_2)_6$— and their molar ratio was 1:1 (product name: "DURANOL T5650E", manufactured by Asahi Kasei Corporation), and the mixture was cooled to −40° C. After that, 50 parts of diisopropylethylamine was added, and then 40 parts of acrylic acid chloride was added. The mixture was sufficiently stirred and subjected to a reaction for 8 hours, and was then returned to ordinary temperature, followed by the removal of a salt and the solvent. After that, the residue was purified by silica gel column chromatography to provide a diacrylate derivative (A-2) of a polycarbonate diol, which had a number-average molecular weight of 600.

(A-3) Di(meth)acrylate derivative of polycarbonate diol (product name: "UH-100DA", manufactured by Ube Industries, Ltd. (number-average molecular weight=900))

A-3 is a compound represented by the formula (1) in which $R_2$s each represent —$(CH_2)_6$—.

Compound Containing Two or More Epoxy Groups (B-1) Bisphenol F diglycidyl ether (bis[4-(glycidyloxy)phenyl]methane, (product name: "jER (trademark) 806", Manufactured by Mitsubishi Chemical Corporation))

(B-2) Bisphenol A diglycidyl ether (2,2-bis(4-glycidyloxyphenyl)propane, manufactured by Tokyo Chemical Industry Co., Ltd.)

Photoradical Polymerization Initiator (C) 1-Hydroxycyclohexyl phenyl ketone (product name: "Irgacure (trademark) 184", manufactured by BASF)

Photocationic Polymerization Initiator (D) Triarylsulfonium-based photoacid generator (product name: "CPI-210S", manufactured by San-Apro Ltd.)

Charpy Impact Test

A test piece was produced and evaluated in conformity with a JIS standard (JISK7111).

Hardness Test

A test piece was produced and evaluated with a durometer ASKER Rubber Hardness Tester Type C (manufactured by Kobunshi Keiki Co., Ltd.) in conformity with a JIS standard (JISK7312). A case of a hardness of 95 or more was evaluated as A, and a case of a hardness of less than 95 was evaluated as B.

Temporal Stability Evaluation

A prepared photocurable resin composition was left to stand at room temperature for 1 week, and a change in turbidness in liquid was visually observed. A case in which there was no change in turbidness was evaluated as A, a case in which turbidness was worsened in 1 week was evaluated as B, and a case in which turbidness was worsened within 1 day was evaluated as C. Even in the case of B, meaning the worsening of turbidness in 1 week, the object of the present disclosure can be achieved.

Example 1

50 Parts of the compound (A-1) represented by the formula (1), 50 parts of the compound (B-1) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidity even after a lapse of 1 week.

The obtained photocurable resin composition was poured into a transparent mold having a predetermined shape, and was irradiated with ultraviolet light through the use of an ultraviolet irradiation apparatus (250 W mercury light source REX-250, manufactured by Asahi Spectra Co., Ltd.), followed by the Charpy impact test and the hardness test. The resultant test piece had a satisfactory Charpy impact strength and hardness of 5.4 and 95 or more, respectively.

When the prepared photocurable resin composition was used and shaped with an optical three-dimensional shaping apparatus (Value3D MagiX ML-48 (manufactured by Mutoh Industries Ltd.)), it was able to be confirmed that the composition was able to be shaped into a satisfactory shape.

Example 2

25 Parts of the compound (A-1) represented by the formula (1), 75 parts of the compound (B-1) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidity even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 3.4 and 95 or more, respectively.

When the prepared photocurable resin composition was used and shaped with the optical three-dimensional shaping apparatus, it was able to be confirmed that the composition was able to be shaped into a satisfactory shape.

Comparative Example 1

100 Parts of the compound (A-1) represented by the formula (1) and 2 parts of the photoradical polymerization initiator (C) were mixed, and the mixture was stirred for 2 hours to provide a photocurable resin composition.

When the obtained photocurable resin composition was stored at room temperature, it was confirmed that there was no change in turbidity even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a Charpy impact strength of 5.4 and a hardness of less than 95, indicating that its toughness was satisfactory, but its hardness was insufficient.

When the prepared photocurable resin composition was used and shaped with the optical three-dimensional shaping apparatus, the shaped object was found to be unintendedly deformed without completely resisting deflection due to its own weight.

Comparative Example 2

100 Parts of the compound (B-1) containing two or more epoxy groups and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidity even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a Charpy impact strength of 1.1 and a hardness of 95 or more, indicating that its hardness was satisfactory, but its toughness was markedly insufficient.

When the prepared photocurable resin composition was used and shaped with the optical three-dimensional shaping apparatus, its curing reaction took time, and hence it was impossible to successfully produce a shaped object.

The above-mentioned results are shown in FIGURE. In general, when two kinds of materials are mixed, a physical property value of the mixture follows a sum rule. When the sum rule is followed, the Charpy impact strength of the cured product of the photocurable resin composition of Example 1 containing 48 mass % of the compound represented by the formula (1) is predicted to be about a half of that of the cured product of the photocurable resin composition of Comparative Example 1 containing 96% of the compound represented by the formula (1). However, it was found that, as shown in FIGURE, the cured product of the photocurable resin composition of Example 1 deviated from the sum rule, and was able to express an unexpectedly satisfactory Charpy impact strength comparable to that of the cured product of the photocurable resin composition of Comparative Example 1. This is presumably because the cured product of the photocurable resin composition according to at least one embodiment of the present disclosure has formed therein an interpenetrating network (IPN) structure in which a network containing a polymer of the compound represented by the formula (1) (i.e., the structure represented by the formula (1')) and a network containing an epoxy resin that is a polymer of the compound containing two or more epoxy groups are entangled with each other.

Example 3

50 Parts of the compound (A-1) represented by the formula (1), 50 parts of the compound (B-2) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidness even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 4.8 and 95 or more, respectively.

When the prepared photocurable resin composition was used and shaped with the optical three-dimensional shaping apparatus, it was able to be confirmed that the composition was able to be shaped into a satisfactory shape.

Example 4

50 Parts of the compound (A-2) represented by the formula (1), 50 parts of the compound (B-1) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidness even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 6.1 and 95 or more, respectively.

When the prepared photocurable resin composition was used and shaped with the optical three-dimensional shaping apparatus, it was able to be confirmed that the composition was able to be shaped into a satisfactory shape.

Example 5

25 Parts of the compound (A-2) represented by the formula (1), 75 parts of the compound (B-1) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that there was no change in turbidness even after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 4.1 and 95 or more, respectively.

When the prepared photocurable resin composition was used and shaped with the optical three-dimensional shaping apparatus, it was able to be confirmed that the composition was able to be shaped into a satisfactory shape.

Example 6

50 Parts of the compound (A-3) represented by the formula (1), 50 parts of the compound (B-2) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that, though turbidness was not worsened within 1 day, the turbidness was worsened after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 4.4 and 95 or more, respectively.

When the prepared photocurable resin composition was used and shaped with the optical three-dimensional shaping apparatus, it was able to be confirmed that the composition was able to be shaped into a satisfactory shape.

Example 7

50 Parts of the compound (A-3) represented by the formula (1), 50 parts of the compound (B-1) containing two or more epoxy groups, 2 parts of the photoradical polymerization initiator (C), and 2 parts of the photocationic polymerization initiator (D) were mixed, and the mixture was stirred for 2 hours to provide a photocurable resin composition.

When the obtained photocurable resin composition was stored at room temperature, it was confirmed that, though turbidness was not worsened within 1 day, the turbidness was worsened after a lapse of 1 week.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a satisfactory Charpy impact strength and hardness of 6.0 and 95 or more, respectively.

When the prepared photocurable resin composition was used and shaped with the optical three-dimensional shaping apparatus, it was able to be confirmed that the composition was able to be shaped into a satisfactory shape.

Comparative Example 3

100 Parts of the compound (B-2) containing two or more epoxy groups and 2 parts of the photocationic polymerization initiator (D) were mixed, and the mixture was stirred for 2 hours to provide a photocurable resin composition.

When the obtained photocurable resin composition was stored at room temperature, it was confirmed that turbidness was worsened within 1 day, and after a lapse of 1 week, the turbidness was further worsened, and besides, solidification occurred.

The obtained photocurable resin composition was poured into a transparent mold having a predetermined shape, and was irradiated with ultraviolet light through the use of the ultraviolet irradiation apparatus, followed by the Charpy impact test and the hardness test. The resultant test piece had a Charpy impact strength of 0.7 and a hardness of 95 or more, indicating that its hardness was satisfactory, but its toughness was markedly insufficient.

When the prepared photocurable resin composition was used and shaped with the optical three-dimensional shaping apparatus, its curing reaction took time, and hence it was impossible to successfully produce a shaped object.

The contents of the materials in each photocurable resin composition and the evaluation thereof, and the evaluations of each cured product are summarized in Table 1.

TABLE 1

| | A (mass %) | B (mass %) | C (mass %) | D (mass %) | Charpy impact strength (kJ/m²) | Hardness | Temporal stability |
|---|---|---|---|---|---|---|---|
| Example 1 | A-1 (48) | B-1 (48) | 2 | 2 | 5.4 | A | A |
| Example 2 | A-1 (24) | B-1 (72) | 2 | 2 | 3.4 | A | A |
| Example 3 | A-1 (48) | B-2 (48) | 2 | 2 | 4.8 | A | A |
| Example 4 | A-2 (48) | B-1 (48) | 2 | 2 | 6.1 | A | A |
| Example 5 | A-2 (24) | B-1 (72) | 2 | 2 | 4.1 | A | A |
| Example 6 | A-3 (48) | B-2 (48) | 2 | 2 | 4.4 | A | B |
| Example 7 | A-3 (48) | B-1 (48) | 2 | 2 | 6 | A | B |
| Comparative Example 1 | A-1 (96) | — | 4 | — | 5.4 | B | A |
| Comparative Example 2 | — | B-1 (96) | — | 4 | 1.1 | A | A |
| Comparative Example 3 | — | B-2 (96) | — | 4 | 0.7 | A | C |

A: compound represented by the formula (1), B: compound containing two or more epoxy groups, C: photoradical polymerization initiator (C), D: photocationic polymerization initiator (D)

It has been revealed from the foregoing that the cured product according to at least one embodiment of the present disclosure has an excellent balance between hardness and Charpy impact strength, and the photocurable resin composition according to at least one embodiment of the present disclosure can be suitably used for the optical three-dimensional shaping method.

According to at least one embodiment of the present disclosure, the photocurable resin composition having a low viscosity that can be suitably used for the optical three-dimensional shaping method, and the cured product excellent in impact resistance and having a sufficient hardness, obtained by photocuring the composition and the three-dimensional shaped object including the cured product are provided.

The photocurable resin composition according to at least one embodiment of the present disclosure can be utilized as a photocurable resin composition to be used for the optical three-dimensional shaping method.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A photocurable resin composition comprising:
a compound represented by the following formula (1):

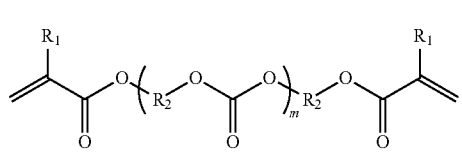

(1)

where:
"m" represents an integer of from 2 to 50;
$R_1$s each represent H or $CH_3$, and $R_1$s may be identical to or different from each other; and
a plurality of $R_2$s represent saturated hydrocarbon groups each having 2 to 8 carbon atoms in a main chain thereof, which may be identical to or different from each other, and the saturated hydrocarbon groups may each have a side chain;
a compound containing two or more epoxy groups;
a photoradical polymerization initiator; and
a photocationic polymerization initiator.

2. The photocurable resin composition according to claim 1, wherein R2s each represent a structure selected from the group consisting of the following formulae (2) to (6):

(2)

where "a" represents an integer of from 2 to 8;

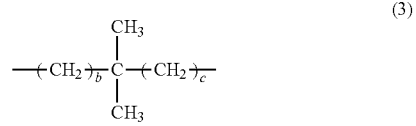

(3)

where b+c is an integer of from 2 to 7, and any one of "b" and "c" may represent 0;

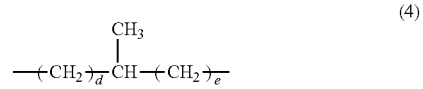

(4)

where d+e is an integer of from 2 to 7, and any one of "d" and "e" may represent 0.

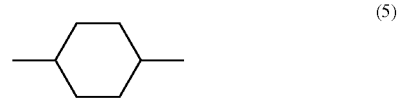

(5)

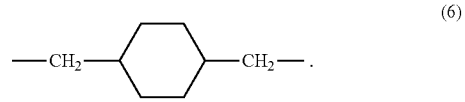

(6)

3. The photocurable resin composition according to claim 1, wherein the Res represent two or more kinds of different saturated hydrocarbon groups.

4. The photocurable resin composition according to claim 1, wherein the compound containing two or more epoxy groups has an aromatic ring.

5. The photocurable resin composition according to claim 4, wherein the compound containing two or more epoxy groups is a monomer of a bisphenol-type epoxy resin.

6. A cured product, obtained by a process comprising curing the composition according to claim 1.

7. A manufacturing method for a three-dimensional shaped object comprising shaping a photocurable resin composition by an optical three-dimensional shaping method, the photocurable resin composition containing:

a compound represented by the following formula (1):

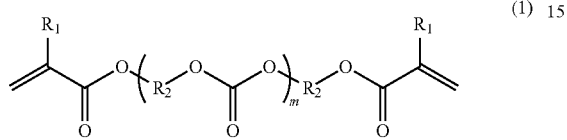

(1)

where:

"m" represents an integer of from 2 to 50;

$R_1$s each represent H or $CH_3$, and $R_1$s may be identical to or different from each other; and a plurality of Res represent saturated hydrocarbon groups each having 2 to 8 carbon atoms in a main chain thereof, which may be identical to or different from each other, and the saturated hydrocarbon groups may each have a side chain;

a compound containing two or more epoxy groups;

a photoradical polymerization initiator; and a photocationic polymerization initiator.

8. A three-dimensional shaped object comprising the cured product of claim 6.

* * * * *